(12) United States Patent
Butler

(10) Patent No.: US 8,484,888 B2
(45) Date of Patent: Jul. 16, 2013

(54) LANDSCAPE SOIL AND WATER RETENTION DEVICE

(75) Inventor: Andrew M. Butler, Novi, MI (US)

(73) Assignee: AMBA Technologies, LLC, Novi, MI (US)

( * ) Notice: Subject to any disclaimer, the term of this patent is extended or adjusted under 35 U.S.C. 154(b) by 398 days.

(21) Appl. No.: 12/693,709

(22) Filed: Jan. 26, 2010

(65) Prior Publication Data

US 2010/0189516 A1    Jul. 29, 2010

Related U.S. Application Data

(60) Provisional application No. 61/147,333, filed on Jan. 26, 2009.

(51) Int. Cl.
*A01G 9/02* (2006.01)
(52) U.S. Cl.
USPC ............ 47/32; 47/66.1; 47/73; 405/284; 405/262
(58) Field of Classification Search
USPC ........... 405/258.1, 262, 272, 284, 285, 302.4, 405/302.6, 302.7; 256/1; 47/66.1, 66.6, 73, 47/76, 32.7, 32
See application file for complete search history.

(56) References Cited

U.S. PATENT DOCUMENTS

| | | | | |
|---|---|---|---|---|
| 2,096,331 A | * | 10/1937 | Livingstone | 405/272 |
| 2,988,393 A | * | 6/1961 | Logan | 47/76 |
| 3,961,443 A | * | 6/1976 | Insalaco | 47/32 |
| 4,395,845 A | * | 8/1983 | Markowitz | 47/32 |
| 5,157,869 A | * | 10/1992 | Minton | 47/73 |
| 2007/0007298 A1 | * | 1/2007 | Tucker et al. | 220/791 |

* cited by examiner

*Primary Examiner* — Sean Andrish
(74) *Attorney, Agent, or Firm* — Young Basile Hanlon & MacFarlane PC

(57) ABSTRACT

Disclosed is an exemplary landscape soil and moisture retaining device. The retaining device may include a wall having a first region and a second region adjacent the first region, the second region inclined relative to the first region, and a flange extending outward from the first region of the wall. The retaining device may further include a raised lip extending from the flange and defining an upper edge of the retaining device. The second region of the wall defining a bottom edge of the retaining device, such that the flange is arranged between the upper and bottom edges of the retaining device.

18 Claims, 5 Drawing Sheets

LANDSCAPE SOIL AND WATER RETENTION DEVICE

CROSS REFERENCE TO RELATED APPLICATIONS

This application claims the benefit of U.S. Provisional Application Ser. No. 61/147,333 filed Jan. 26, 2009, which application is hereby incorporated by reference in its entirety.

BACKGROUND

Sloping grades can present a variety of landscaping problems. Erosion is an example of one such problem. Rain can wash away topsoil and expose the roots of plants, which in turn may cause the plants to die. A low level of water infiltration is also a problem that may be an issue when landscaping on a slope. Since water from rainfall or a sprinkler system tends to run down the grade, the water doesn't have a chance to soak into the ground and nourish plants or shrubs used in the landscaping. Plants and greenery at the bottom of the slope tend to receive too much water, whereas plants at the top of the slope may not get enough. Further, fertilizer tends to wash down the slope, which may leave plants at the top undernourished and plants at the bottom receiving too many nutrients. These and other conditions make it difficult to grow plants on a sloping grade.

A variety of solutions have been previously proposed for minimizing problems associated with maintaining landscaping on sloping grades. Various solutions include ground covers, terracing, re-grading, and retaining walls. For steeper hills, or those in areas that can't be re-graded easily, terracing may solve slope related problems by creating smaller, level planting beds. To assist in retaining water in the vicinity of the plant's root system, it has been proposed that water impermeable root barrier envelopes may be installed around the roots. A problem with employing root barrier envelopes is that while the upper surface near the plant may retain water, the lower regions may receive insufficient water, aeration and nutrients, which can adversely affect the growth characteristics of the plant. A common erosion prevention option employed by landscapers is to use mulch as a ground cover. Mulches, such as straw, bark, sawdust, leaves, wood pulp and fibers, clippings, and compost tend to absorb moisture and release it slowly, but can be washed away by heavy rains, thus exposing the soil to erosion. Woven fabric matting or plastic sheets may also be used on especially steep slopes. Adding large rocks in steeper areas, or perhaps small rock gardens at various points along a slope, may slow the flow of water down the slope. While these methods may be reasonably effective at minimizing soil erosion on a sloping grade, they may not be very effective at minimizing water runoff, which may ultimately deprive the plants of essential moisture and nutrients.

DETAILED DESCRIPTION

Figure 1:
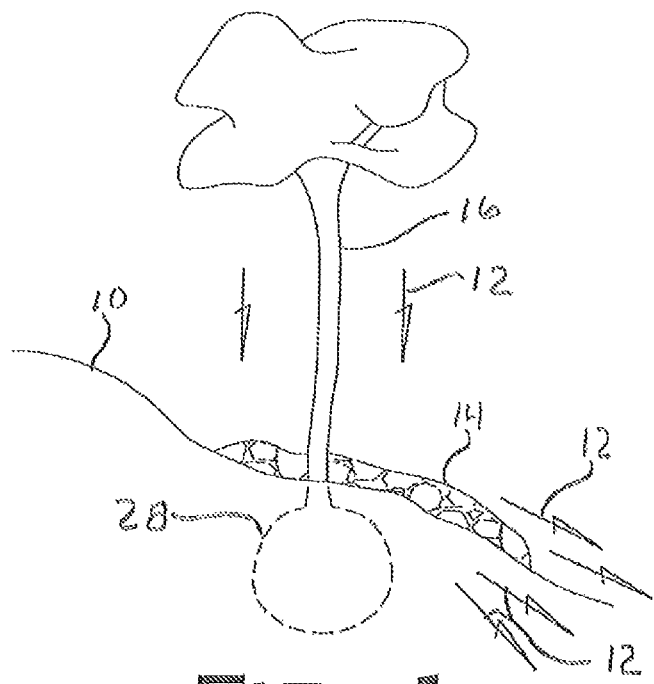
FIG. 1 is a partial cross-sectional view of a plant growing on a sloping hillside.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present device. Further, the descriptions set forth herein are not intended to be exhaustive or otherwise limit or restrict the claims to the precise forms and configurations shown in the drawings and disclosed in the following detailed description.

Figure 2:
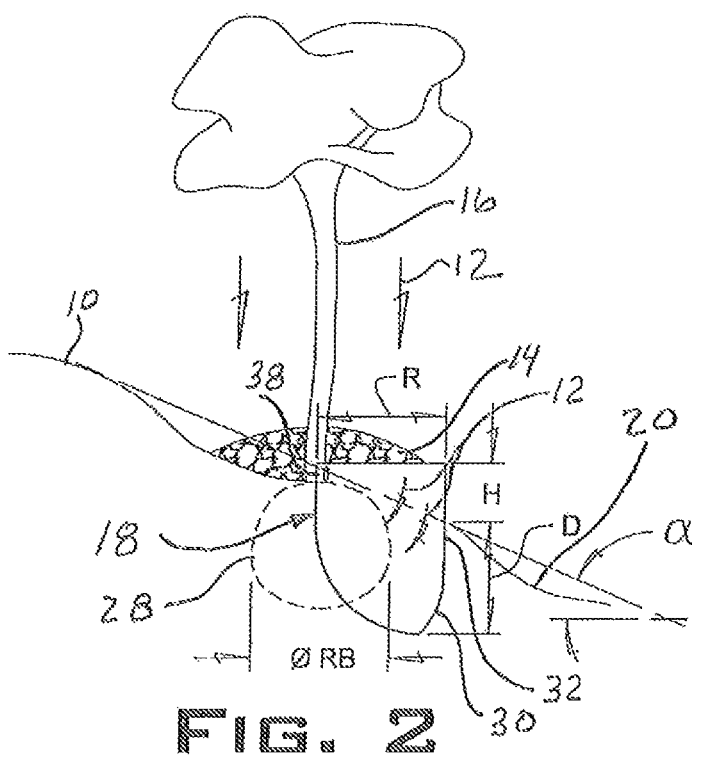
FIG. 2 is a partial cross-sectional view of an exemplary soil and water retaining device installed on a sloping grade adjacent a plant.
Figure 3:
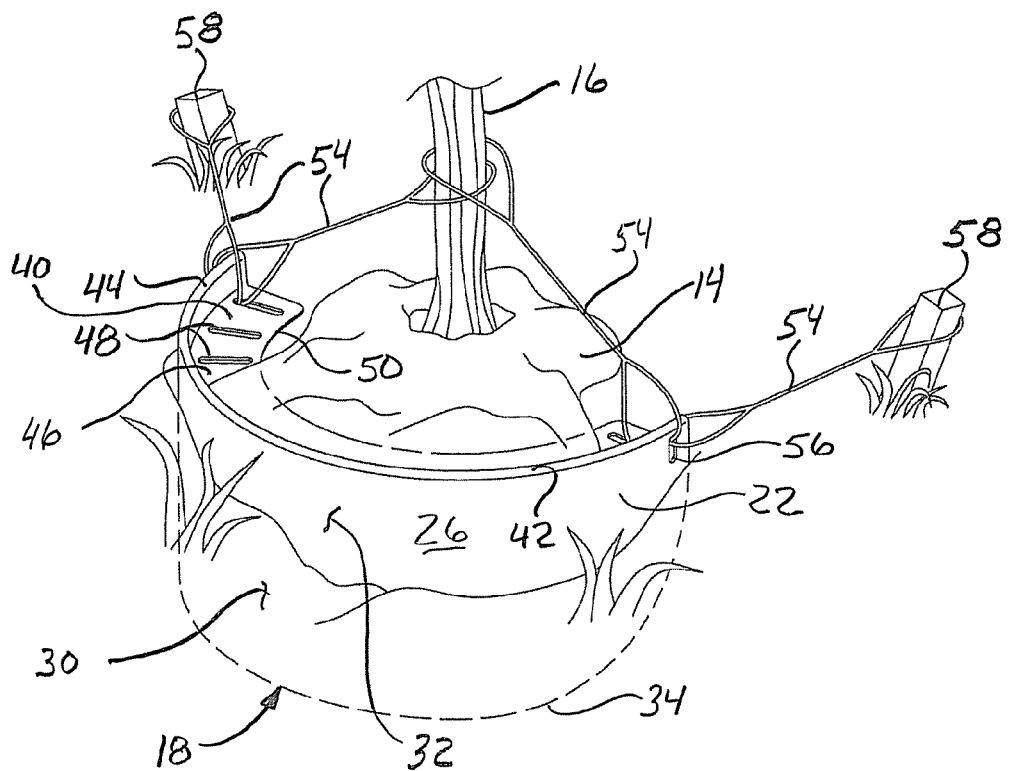
FIG. 3 is a front perspective view of the exemplary soil and water retaining device shown in an installed position adjacent to a plant.

Caring for and maintaining plants on a sloping grade can be difficult. As shown in FIG. 1, a sloping grade 10 tends to causes water 12, for example, from rain and sprinklers, to flow downhill. Although various forms of groundcovers 14 may reduce the amount of runoff, they are generally not very effective, and provide no mechanism for actively directing the water toward the roots of a plant 16. With reference to FIGS. 2 and 3, a soil and water retention device 18 is shown in an installed position as part of a landscaping system. Soil and water retention device 18 is generally installed along a downhill side 20 of plant 16. Unlike conventional retaining systems, retaining device 18 includes various features, which are discussed in more detail subsequently, that may help prevent soil from eroding around the plant and assist in channeling moisture and nutrients down toward the plant roots.

With reference to FIGS. 3 thru 7, retaining device 18 may include an upstanding contoured wall 22. Wall 22 includes an inside surface 24 that is typically positioned facing plant 16 when the retaining device is installed as part of the landscaping system. An outside surface 26 of wall 22 faces away from plant 16. Depending on the configuration of the landscaping system in which the retaining device is incorporated, at least a portion of outside surface 26 may be arranged above ground and viewable when the retaining device is installed in the landscape system.

When viewed from the outside, wall 22 may have a generally convex shape extending around a vertical axis of retaining device 18. For purposes of discussion, the vertical axis of retaining device 18 generally corresponds to an axis of symmetry of the retaining device. In the exemplary configuration illustrated in the figures, wall 22 is shown to have a generally semicircular shape when viewed from the top or bottom, (see, for example, FIG. 5). It shall be appreciated, however, that this is merely one example of the many different contours that may be employed. Other contours may include, but are not limited to, multifaceted shapes, such as square, rectangular, hexagonal, to name a few, as well as smoothly transitioning arcuate contours. Wall 22 may also include various combinations of multifaceted and smooth transitioning contours. For example, opposite ends of wall 22 may be configured substantially flat, whereas the region between the ends may have a smoothly transitioning elliptical contour. Ultimately, the contour of wall 22 may be influenced by a variety of factors, including but not limited to the functional and aesthetic requirements of a particular application. Although shown to have a generally smooth outside surface 26, wall 22 may also be configured to simulate various landscaping materials, such as rocks, bricks, boulders, and timbers, to name a few.

Figure 5:
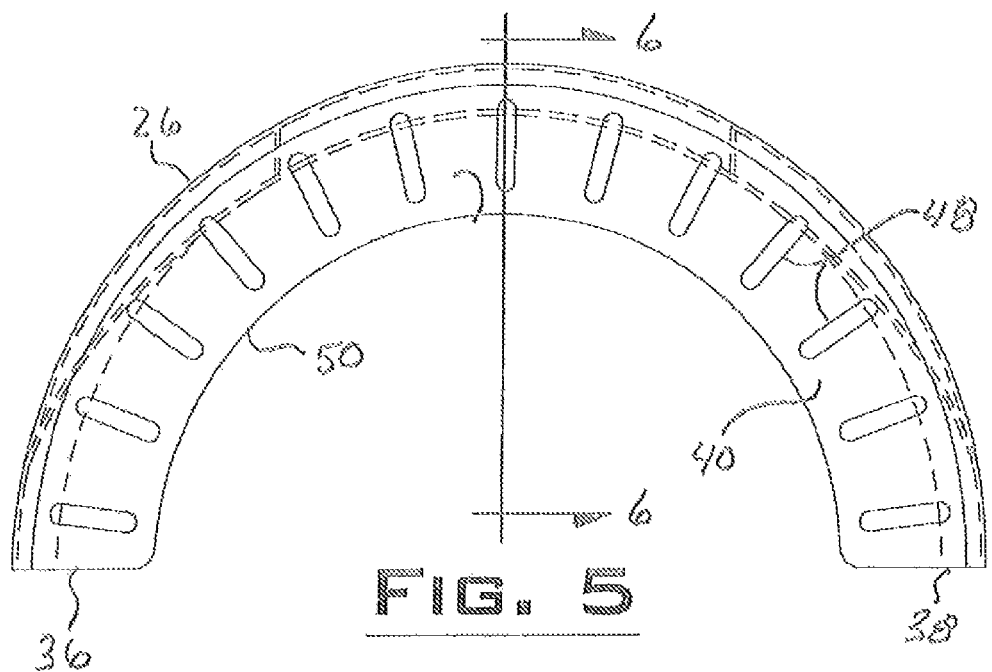
FIG. 5 is a top elevational view of the exemplary soil and water retaining device.

Retaining device 18 may generally be configured as a curved arc when viewed from either the top or bottom (see, for example, FIG. 5). This configuration allows retaining device 18 to generally wrap around a root ball 28 of plant 16 (see FIGS. 1 and 2) when installed in the landscaping system. For purposes of discussion, the exemplary configuration illustrated in the figures is shown to extend over a semicircular arc of approximately 180 degrees. It shall be appreciated, however, that in practice retaining device 18 may extend over a larger or smaller arc depending on the requirements of a particular application.

Figure 6:
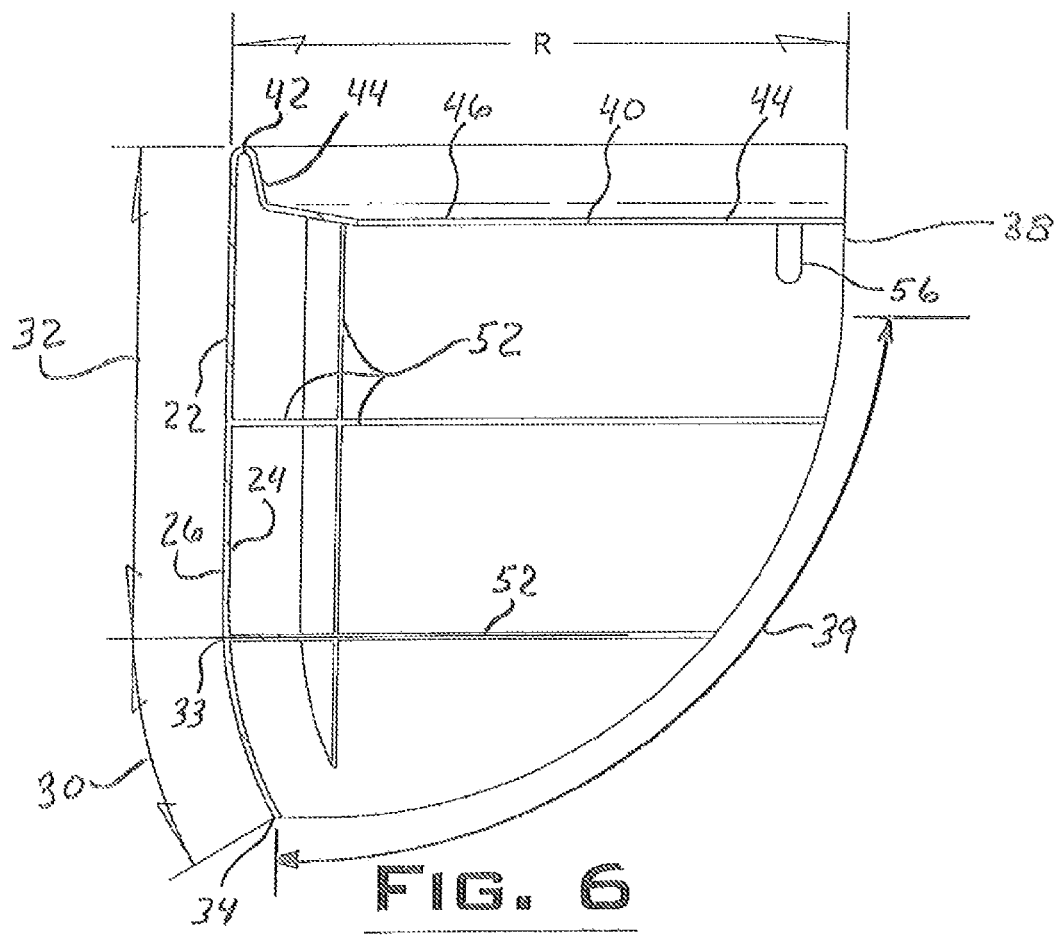
FIG. 6 is a side cross-sectional view of the exemplary soil and water retaining device taken along section line 6-6 of FIG. 4.

With reference also to FIG. 6, a lower region 30 of wall 22 may be inclined inward from an upper region 32 toward a center of retaining device 18. This feature helps direct water toward the roots of plant 16. The point at which wall 22 begins to transition inward may be selected such that the inwardly inclined portion of the wall is positioned below ground level when the retaining device is installed in the landscaping system. Although the inwardly inclined wall region 30 is shown to have a generally arcuate contour starting from a transition point 33 and continuing through to a lower edge 34 of retaining device 18, it shall be appreciated that the inclined region may also be configured to have a substantially flat contour.

Figure 7:
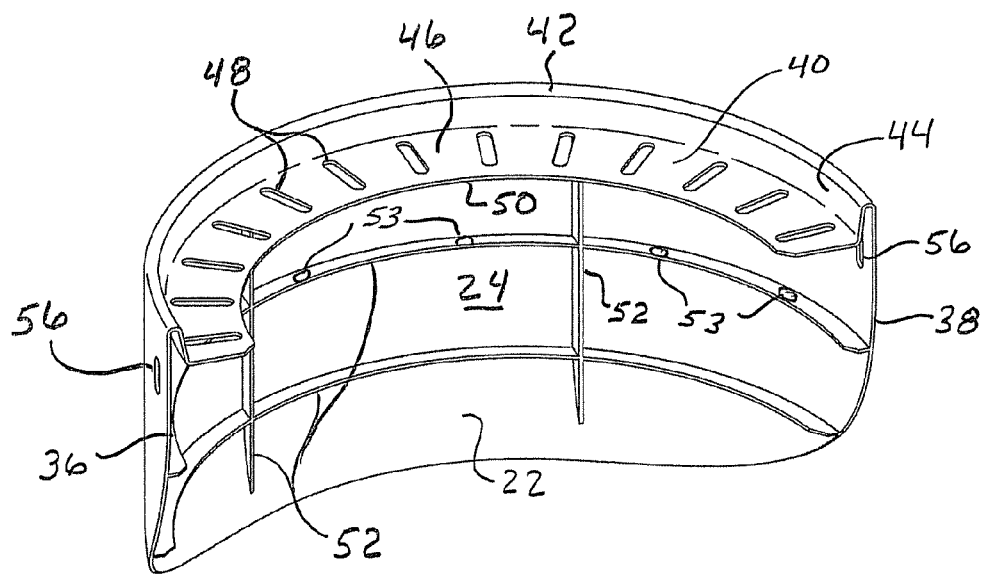
FIG. 7 is a rear perspective view of the exemplary soil and water retaining device.

With continued reference to FIGS. 5 thru 7, opposite ends 36 and 38 of wall 22 may include a cutback region 39 to provide clearance for the roots of plant 16 to grow past retaining device 18. The extent and shape of cutback region 39 may be determined, at least in part, on the requirements of the particular application. For example, a retaining device that extends over an arc of 180 degrees may benefit from a larger cutback region than a retaining device that extends over an arc of less than 180 degrees. Generally speaking, the benefit associated with cutting back ends 36 and 38 of wall 22 may increase as the arc length of retaining device 18 increases.

With continued reference to FIGS. 3 thru 7, retaining device 18 may include a flange 40 positioned near a top edge 42 of wall 22. Flange 40 provides support for top edge 42 of wall 22, and may help retaining device 18 maintain its curved contour when installed in the landscape system. Flange 40 also helps direct water inward toward plant 16. Flange 40 extends generally inward from an inner perimeter of wall 22 toward the center of retaining device 18. Flange 40 may be positioned below top edge 42 of wall 22 so as to form a generally upwardly extending lip 44 between a top surface 46 of flange 40 and top edge 42 of wall 22. Lip 44 helps to capture and direct water toward the plant roots and provides a retaining mechanism for preventing soil and groundcover from being washed away from plant 16. One or more apertures 48 may extend through flange 40. Apertures 48 allow a portion of the water that collects on flange 40 to pass through the flange and into the ground below the flange, thereby providing water and nutrients to plant roots the may be growing near the inside surface 24 of wall 22. To assist in directing water toward the plant roots, flange 40 may have a slight downward incline from wall 22 to an inner edge 50 of flange 40. Flange 40 may be integrally formed with wall 22, or may be suitably attached to the wall as a separate component.

Figure 4:
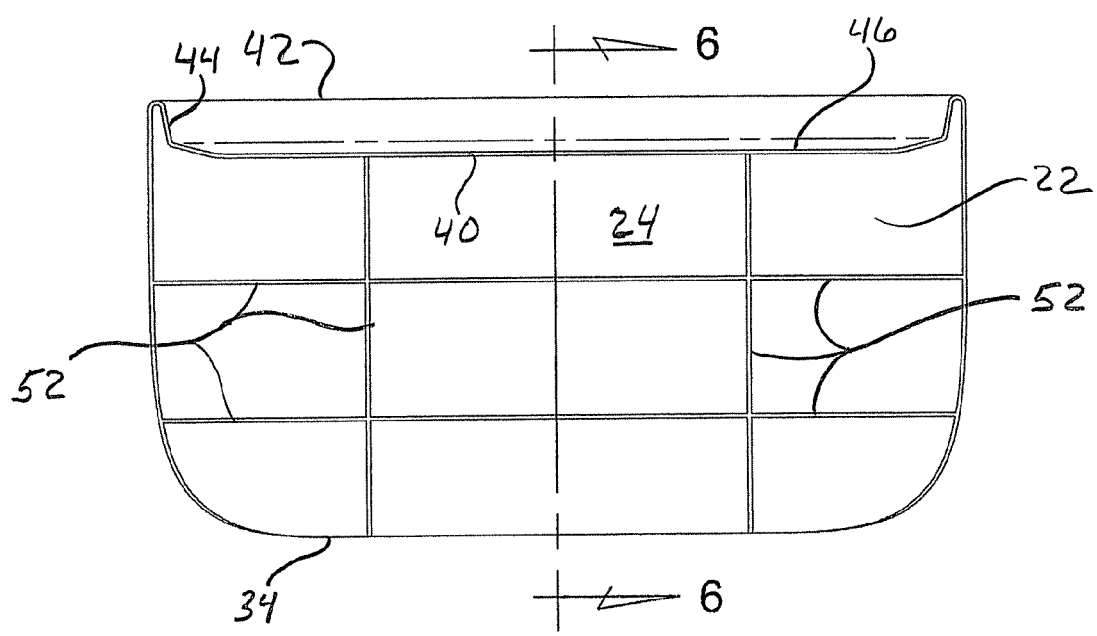
FIG. 4 is a rear elevational view of the exemplary soil and water retaining device.

With reference to FIGS. 4, 6 and 7, retaining device 18 may include one or more reinforcing ribs 52 extending inward from inside surface 24 of wall 22. Reinforcing ribs 52 may be arranged in a variety of configurations. In the exemplary configuration illustrated in the figures, reinforcing ribs 52 are arranged in a horizontal and vertical pattern. The number and location of reinforcing ribs 52 may vary depending, at least in part, on the structural requirements of retaining device 18. In practice, there may be fewer or more reinforcing ribs 52 than shown in the figures. Reinforcing ribs 52 may also have a different thickness and may extend a longer or shorter distance from inside surface 24 of wall 22. Reinforcement ribs 52 may also be arranged in a different pattern, such as a honeycomb. Similar to flange 40, reinforcing ribs 52 may also include one or more apertures 53 to allow moisture to pass through the reinforcing rib. Reinforcing ribs 52 may be integrally formed with wall 22, or may be suitably attached to the wall as separate components.

With continued reference to FIGS. 2 and 3, retaining device 18 may be installed in a landscaping system by positioning retaining device 18 on the downhill side of plant 16. Retaining device 18 may be held in position by burying lower region 30, and possibly at least a portion of upper region 32 (see FIG. 6), of retaining device 18 in the ground. Soil and/or other planting material, such as peat moss and mulch, may be used to backfill retaining device 18. Retaining device 18 may be positioned such that a top of root ball 28 of plant 16 is located above flange 40. This allows groundcover 14 to be placed over flange 40 (as shown in FIG. 3), while at the same time avoiding mounding the groundcover around the trunk of plant 16, which could be detrimental to the health of the plant. If desired, various ground covers, such as bark, wood chips, as well as other materials, may be placed around the plant so as to cover flange 40. Groundcover 14 is retained by lip 44.

With continued reference to FIG. 3, to help prevent retaining device 18 from shifting, one or more tether straps 54 may be utilized to secure the ends of the retaining device to either plant 16 or the surrounding ground. One or more tether apertures 56 may be provided in wall 22 for attaching tether 54 to retaining device 18. An opposite end of tether 54 may be attached to an anchoring device 58, such as a stake, which may be suitably secured to the surrounding ground. Anchoring device 58 may be partially exposed or buried below grade level. Alternatively, an end of tether 54 may be secured to plant 16. Tethering of retaining device 18 may be particularly desirable when installing the retaining device on grades having a slope in excess of 40 degrees.

Figure 8:
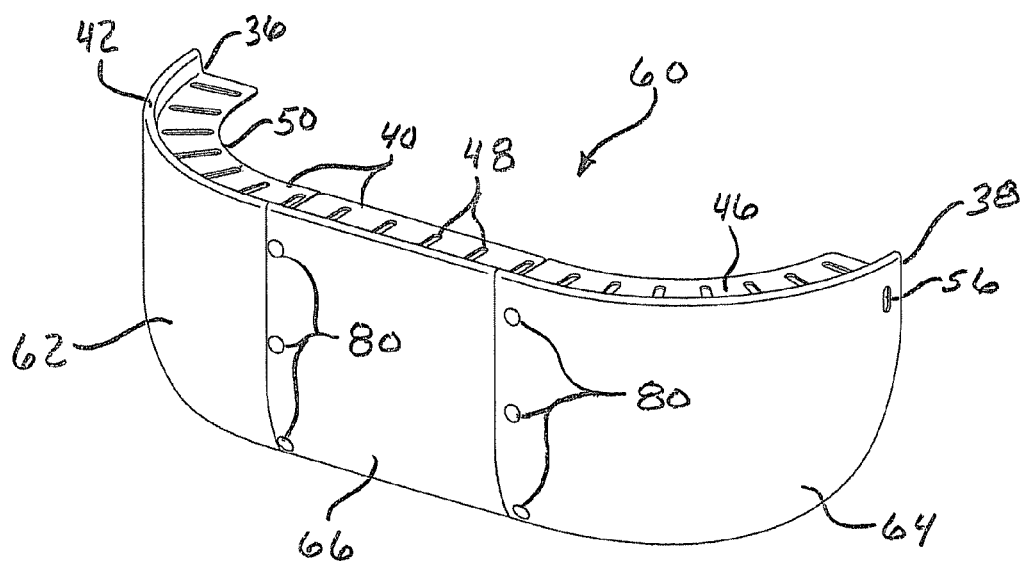
FIG. 8 is a front perspective view of a modular exemplary soil and water retaining device employing an extension panel.
Figure 9:
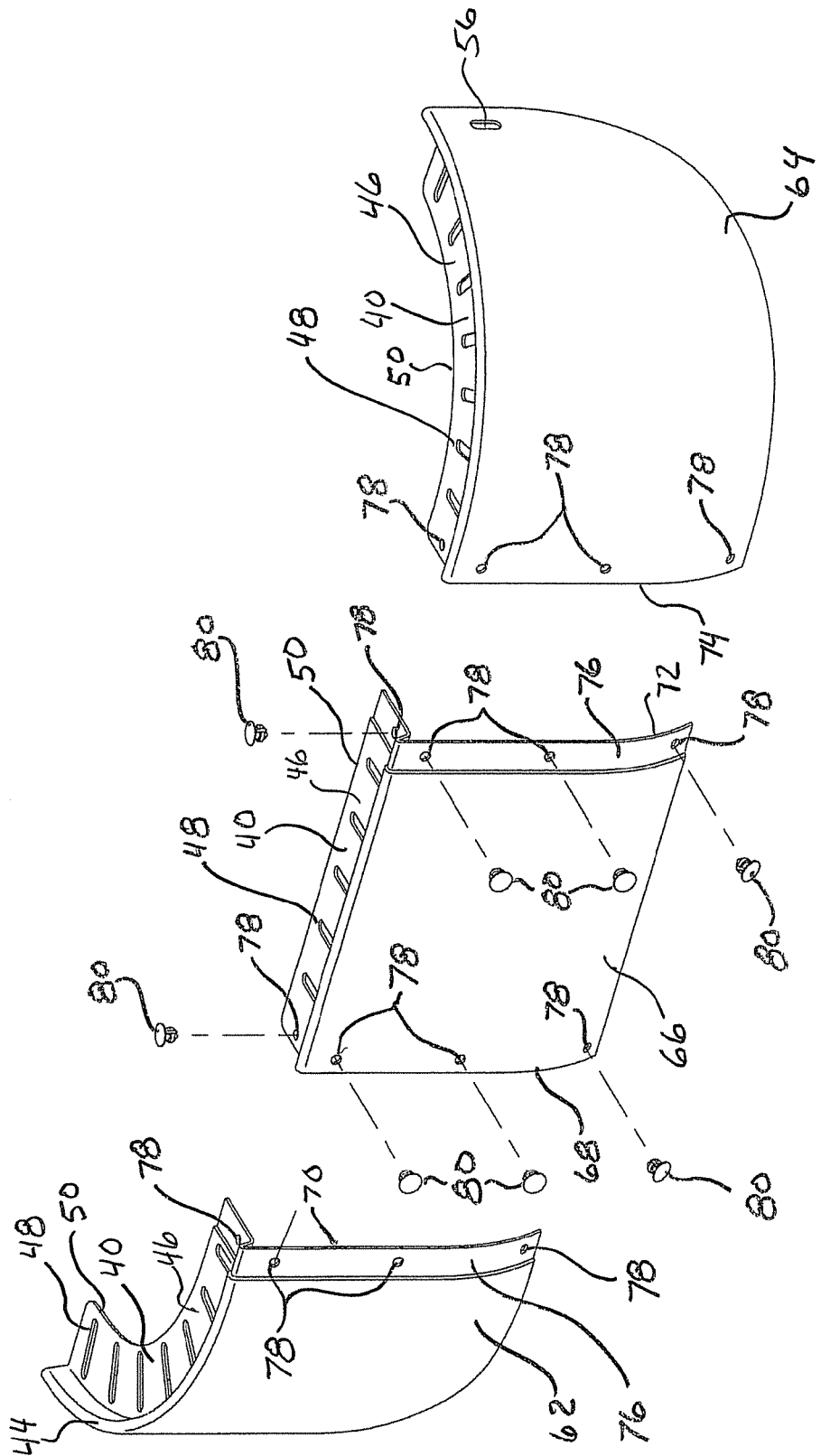
FIG. 9 is an exploded front perspective view of the exemplary soil and water retaining device shown in FIG. 8.

With reference to FIGS. 8 and 9, an exemplary modular retaining device 60 that may be readily adapted to different applications is illustrated. Modular retaining device 60 may include multiple panels that may be interconnected to form a single unitary retaining device. In the exemplary configuration shown in FIGS. 8 and 9, modular retaining device 60 may include a left end panel 62, a right end panel 64, and one or more center panels 66. Each of the panels 62,64,66 may be configured in a similar manner as previously described with respect to retaining device 18. Multiple panels 62,64,66 may be connected end-to-end to produce a retaining system of a desired configuration. A complete modular retaining system 60 will typically minimally consists of a left end panel 62 interconnected to a right end panel 64. Such a configuration results in a retaining system that is substantially the same as that shown in FIGS. 3-7.

Modular retaining system 60 may be modified by adding one or more center panels 66. When using a single center panel 66, an end 68 of center panel 66 is suitably connected to and end 70 of left end panel 62, and an opposite end 72 of center panel 66 is likewise connected to an end 74 of right end panel 64. Further, multiple center panels 66 may be connected end-to-end to produce a retaining system having a desired width. The flexibility to modify the configuration of retaining system 60 to suit a particular application may be particularly beneficial when using a single retaining device in a landscaping system involving multiple plants.

Any of a variety of connecting mechanisms may be employed for interconnecting panels 62,64,66. An example of one such connection mechanism is illustrated in FIGS. 8 and 9. One end of each panel 62,64,66 may include a recessed region 76 configured to receive an end of the adjoining panel. Two adjacent panels may be joined together by engaging an end of one panel with recessed region 76 of the adjoining panel. This joint configuration allows the ends of the two adjoining panels to overlap one another. Each panel may be provided with one or more holes 78 that align with a corresponding hole in the adjoining panel when the panels are interconnected. The interconnected panels may be secured together by engaging a fastener 80 with each set of holes in the interconnected panels. Various fasteners 80 may be utilized to secure the panels together, including but not limited to, screws, bolts, pushpins, and rivets. It shall be appreciated, however, that this is merely one example of the various types of connection mechanisms that may be employed. Other types of connection mechanisms include, but are not limited to, snaps, tongue and groove, bayonet, dovetail, and interlocking male/female members.

Although the various dimensions of retaining device 18 may be adjusted to accommodate the requirements of a particular application, certain dimensional features of the retaining device may also be determined based on certain physical characteristics of the environment in which the retaining device will be used. For example, with reference to FIGS. 2 and 6, a radius "R" of retaining device 18 is generally sized to be larger than the diameter "ØRB" of root ball 28. Generally, speaking, retaining device 18 may be arranged generally horizontal relative to adjacent plant 16 such that the opposite ends 36 and 38 (see FIG. 5) of the retaining device are aligned with the trunk of plant 16, and may be arranged vertically such that flange 40 is positioned at approximately the top of root ball 28. With retaining device 18 in this position, the exposed height H of the retaining device, measured from the ground to the top of flange 40, may be estimated based on the radius R of retaining device 18 and the slope of the grade, denoted as "α" in FIG. 2. The exposed height H of retaining device 18 may determined using the following formula:

$$H \approx R \times \tan(\alpha) = \textit{ØRB} \times \tan(\alpha)$$

Thus, for example, assuming plant 16 has a root ball diameter ORB of 24 inches, and is planted on a grade having a slope α of 30 degrees, the maximum exposed height H of retaining device 18 is approximately 6.9 inches.

In order to minimize the possibility that retaining device 18 may shift after being installed in the landscaping system, lower region 30 (see FIG. 6) of wall 22 may be sufficiently buried in the ground. A distance "D" that retaining device 18 should be buried in the ground may be estimated as a function of the grade slope angle α. Generally speaking, retaining device 18 should be buried at least six inches in the ground (i.e., D≧6 inches). For grades with a slope angle equal or greater than 39 degrees, retaining device should be buried at least eight inches in the ground (i.e., D≧8 inches).

The depth D at which retention device 18 is buried in the ground may affect the amount of water and nutrients that are directed toward the plant root ball. Increasing the depth D will generally increase the amount of water retained around the plant root ball. The desired depth D for maximizing water retention around the plant root ball may be estimated as a function of root ball diameter "ØRB", using the following formula:

$$D \geq 0.75 \textit{ØRB}$$

Thus, for example, assuming plant 16 has a root ball diameter ØRB of 24 inches, the depth D at which retaining device 18 should be buried in the ground to maximize water retention is approximately 18 inches.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain features, and should in no way be construed so as to limit the claimed device.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A landscape soil and moisture retaining device comprising:
   a wall having a first region and a second region adjacent the first region, the second region inclined relative to the first region, a bottom edge, a first side edge defining a first end of the wall arranged adjacent the bottom edge and a second side edge defining a second end of the wall arranged opposite the first side edge and adjacent the bottom edge, at least one of the first and second side edges including a cutback region inclined forward and downward from the corresponding first and second ends of the wall to the bottom edge of the wall; and
   a flange extending inward from the first region of the wall.

2. The retaining device of claim 1 further comprising a raised lip extending from the flange.

3. The retaining device of claim 2, wherein the first region is disposed between the raised lip and the second region.

4. The retaining device of claim 2, wherein the raised lip defines an upper edge of the retaining device and the second region defines the bottom edge of the retaining device, wherein the flange is arranged between the upper and bottom edges.

5. The retaining device of claim 1, wherein the wall includes a concave inner surface and a convex outer surface, the flange extending radially inward from the inner surface of the wall.

6. The retaining device of claim 5, wherein the flange is inclined relative to the first region of the wall.

7. The retaining device of claim 5, wherein the flange includes at least one aperture extending through the flange.

8. The retaining device of claim 5, wherein the second region of the wall defines the bottom edge of the retaining device, the flange inclined away from the raised lip and toward the bottom edge of the retaining device.

9. The retaining device of claim 1, wherein the wall includes a concave inner surface at least partially defining an inner region of the retaining device, the second region of the wall inclined toward the inner region of the retaining device.

10. The retaining device of claim 9 further comprising at least one rib extending outward from the inner surface of the wall.

11. A modular landscape soil and moisture retaining device comprising:
a first panel having a wall including a first region, a second region inclined relative to the first region, a bottom edge, a first side edge defining a first end of the first panel arranged adjacent the bottom edge and configured to engage a correspondingly configured side edge of a second panel, and a second side edge defining a second end of the first panel opposite the first side edge, the second side edge including a cutback region inclined forward and downward from the second end of the first panel to the bottom edge of the wall; and
a flange extending inward from the first region of the wall of the first panel.

12. The modular retaining device of claim 11, where the first panel further includes a raised lip extending from the flange.

13. The modular retaining device of claim 12, wherein the raised lip defines an upper edge of the first panel, the flange arranged between the upper and bottom edges of the first panel.

14. The modular retaining device of claim 12, wherein the second region defines the bottom edge of the first panel.

15. The modular retaining device of claim, 12, wherein the flange is inclined relative to the first region of the wall in a direction generally away from the lip and toward the bottom edge of the first panel.

16. The modular retaining device of claim 11, wherein the wall of the first panel includes an outside surface and an opposite inside surface, the flange extending from the inside surface and the second region of the wall inclined away from the outside surface.

17. The modular retaining device of claim 11, wherein a second side edge of the second panel configured to engage a correspondingly configured side edge of a third panel.

18. The modular retaining device of claim 11, wherein the flange of the first panel engages a flange of the second panel when the two panels are connected.

* * * * *